US006973523B1

(12) United States Patent
Kaewell, Jr. et al.

(10) Patent No.: US 6,973,523 B1
(45) Date of Patent: Dec. 6, 2005

(54) CODE DIVISION MULTIPLE ACCESS MODEM INTERFACE

(75) Inventors: John D. Kaewell, Jr., Jamison, PA (US); Stratis Gavnoudias, Bellmore, NY (US)

(73) Assignee: InterDigital Technology Corp., Wilmington, DE (US)

( * ) Notice: Subject to any disclaimer, the term of this patent is extended or adjusted under 35 U.S.C. 154(b) by 254 days.

(21) Appl. No.: 09/699,145

(22) Filed: Oct. 27, 2000

Related U.S. Application Data (60) Provisional application No. 60/192,230, filed on Mar. 27, 2000.

(51) Int. Cl.[7] ........................ G06F 13/14; G06F 13/00; H01L 12/50; H04J 3/00
(52) U.S. Cl. ...................... 710/305; 710/106; 710/100; 370/360; 370/521
(58) Field of Search ............................... 370/360, 364, 370/525, 458, 535, 352, 395, 524; 375/150, 375/340; 455/445; 710/305; 714/800, 755; 379/93, 221

(56) References Cited

U.S. PATENT DOCUMENTS

| | | | | |
|---|---|---|---|---|
| 4,133,979 A * | 1/1979 | Helliwell et al. | ............ | 370/525 |
| 5,007,045 A | 4/1991 | Tsuzuki | | |
| 5,056,084 A | 10/1991 | Le Corre | | |
| 5,063,592 A * | 11/1991 | Cannella et al. | ........ | 379/220.01 |
| 5,381,422 A * | 1/1995 | Shimizu | ..................... | 714/755 |
| 5,396,504 A * | 3/1995 | Pack | .......................... | 714/755 |
| 5,483,556 A * | 1/1996 | Pillan et al. | ................. | 375/340 |
| 5,793,841 A * | 8/1998 | Jung et al. | ................... | 714/800 |
| 5,828,695 A | 10/1998 | Webb | | |
| 5,930,715 A * | 7/1999 | Chambers | ................... | 455/445 |
| 6,009,093 A | 12/1999 | Choe | | |
| 6,058,111 A * | 5/2000 | Beyda et al. | ............... | 370/360 |
| 6,101,198 A * | 8/2000 | Koenig et al. | .............. | 370/535 |
| 6,301,291 B1 * | 10/2001 | Rouphael et al. | ........... | 375/150 |
| 6,356,549 B1 * | 3/2002 | Hori | ........................... | 370/364 |
| 6,415,348 B1 * | 7/2002 | Mergard et al. | ............ | 710/305 |
| 6,501,766 B1 * | 12/2002 | Chaar et al. | ................. | 370/458 |
| 6,535,505 B1 * | 3/2003 | Hwang et al. | .............. | 370/352 |
| 6,570,976 B2 * | 5/2003 | Asada et al. | ........... | 379/221.01 |
| 6,614,782 B1 * | 9/2003 | Wehrend et al. | ............ | 370/352 |
| 6,628,659 B1 * | 9/2003 | Park | ........................ | 370/395.6 |
| 6,681,001 B1 * | 1/2004 | Clayton et al. | .......... | 379/93.05 |
| 6,765,913 B1 * | 7/2004 | Lowe et al. | ........... | 370/395.21 |
| 6,804,267 B1 * | 10/2004 | Long et al. | .................. | 370/524 |

FOREIGN PATENT DOCUMENTS

| | | |
|---|---|---|
| GB | 2318253 | 4/1998 |

(Continued)

*Primary Examiner*—Glenn A. Auve
*Assistant Examiner*—Christopher E. Lee
(74) *Attorney, Agent, or Firm*—Volpe and Koenig, P.C.

(57) ABSTRACT

A modem interface transfers data between a high data rate interface and a wireless interface. The modem interface has a plurality of parallel data highways. Each data highway has frames with time slots for transferring data. The plurality of highways outputs data to the high data rate interface and the wireless interface in selected time slots. At least one of the data highways has an input configured to receive data from the high data rate interface in selected time slots. At least one of the data highways has an input configured to receive data from the wireless interface in selected time slots. A processor controls the transfer of data between the plurality of highways.

23 Claims, 3 Drawing Sheets

FOREIGN PATENT DOCUMENTS

| | | |
|---|---|---|
| JP | 10013487 | 4/1998 |
| WO | 9013871 | 11/1990 |
| WO | 9013872 | 11/1990 |
| WO | 9748191 | 12/1997 |
| WO | 9949677 | 9/1999 |
| WO | 9962288 | 12/1999 |

* cited by examiner

CODE DIVISION MULTIPLE ACCESS MODEM INTERFACE

This application claims priority from U.S. Provisional Application No. 60/192,230, filed on Mar. 27, 2000.

BACKGROUND

The present invention generally relates to wireless communication networks. In particular, the invention relates to modem interfaces used in wireless communication networks.

Figure 1:
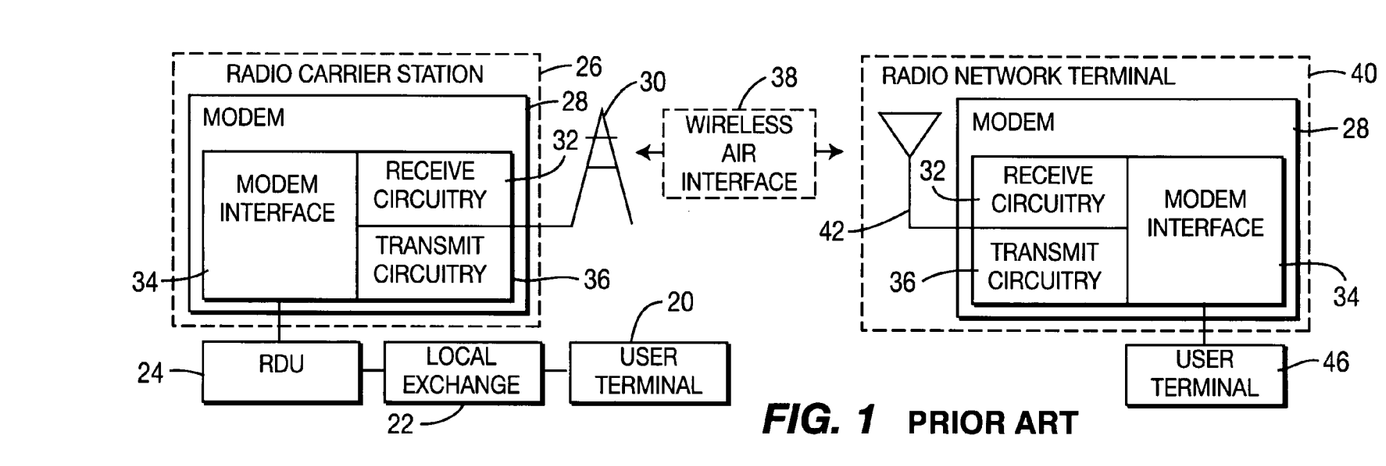
FIG. 1 illustrates a wireless communication network.

Modem interfaces as used in wireless communication networks, such as code division multiple access (CDMA) wireless networks, are commonly used to transfer data between wired components of the network and a wireless air interface 38 of the network. FIG. 1 illustrates a simplified wireless communication network. A user terminal 20 is connected to a local exchange 22. The user terminal 20 transmits data over the local exchange 22 through a radio distribution unit (RDU) 24.

The data sent through the RDU 24 is received by a modem 28 in a radio carrier station (RCS) 26 prior to transmission over the air interface 38. The modem interface 34 takes the data that was transferred over the local exchange 22 and RDU 24 and converts it into a format compatible with the transmit circuitry 36 of the modem 28. The transmit circuitry 36 converts the data into a format suitable for transmission over the wireless air interface 38. The data is subsequently transmitted over the air interface 38 by the base station 30 and received by an antenna 42 at a radio network terminal (RNT) 40. The received signals are processed by the receive circuitry 32 of the RNT's modem 28. The processed signals are sent to a modem interface 34 which converts the signals into a format to be sent to a second user terminal 46.

Conversely, data to be sent by the second user terminal 46 is sent to the modem interface 34 of the RNT 40. The data is processed to be in a format suitable for the transmit circuitry 36 of the modem 28. The transmit circuitry 36 converts the processed data into a format suitable for transfer over the air interface 38. The data is subsequently transmitted over the air interface 38 using an antenna 42 and received by the base station 30. The received data is processed by the receive circuitry 32 of the base station's modem 28. The processed data is further processed by the modem interface 34 to be in a format suitable for transmission through the RDU 24 and local exchange 22. The data is subsequently transferred through the RDU 24 and local exchange 22 to the user terminal 20.

In the past, wireless communication networks were used primarily to transfer voice signals. However, the demand for wireless transmission of data is ever increasing. In particular, the demand for transmitting high data rates, such as those required for integrated services digital networks (ISDNs), over wireless networks is ever increasing. Accordingly, it is desirable to have a modem interface capable of handling high data rates.

SUMMARY

A modem interface transfers data between the high data rate interface and a wireless interface. The modem interface has a plurality of parallel data highways. Each data highway has frames with time slots for transferring data. The plurality of highways outputs data to the high data rate interface and the wireless interface in selected time slots. At least one of the data highways has an input configured to receive data from the high data rate interface in selected time slots. At least one of the data highways has an input configured to receive data from the wireless interface in selected time slots. A processor controls the transfer of data between the plurality of highways.

DETAILED DESCRIPTION OF THE PREFERRED EMBODIMENTS

Figure 2:
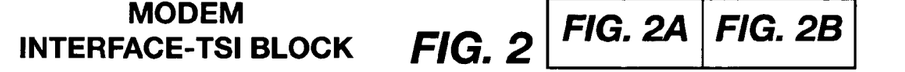
FIGS. 2A and 2B, hereinafter referred to as FIG. 2, illustrate a modem interface.
Figure 2A:
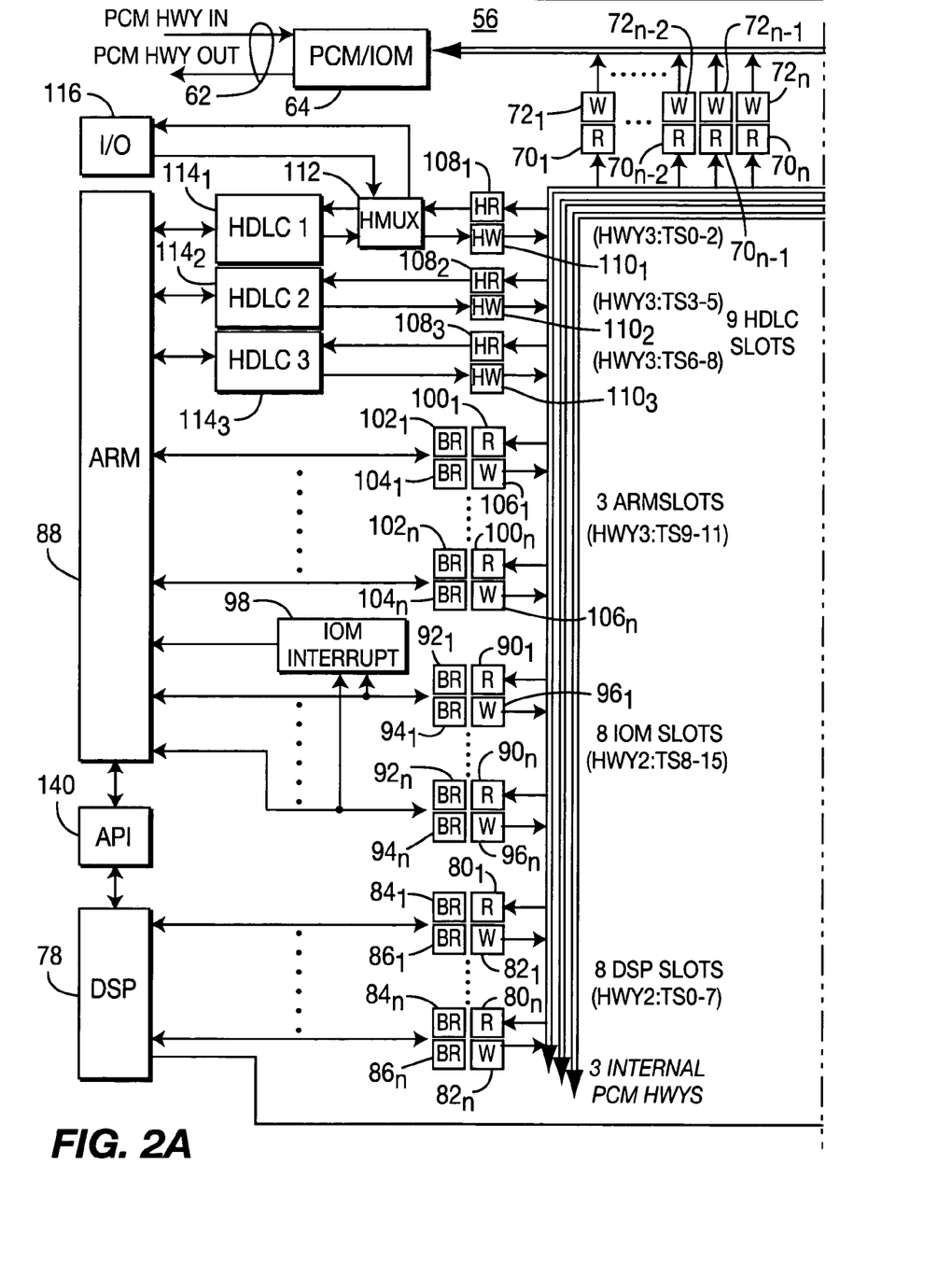
Figure 2B:
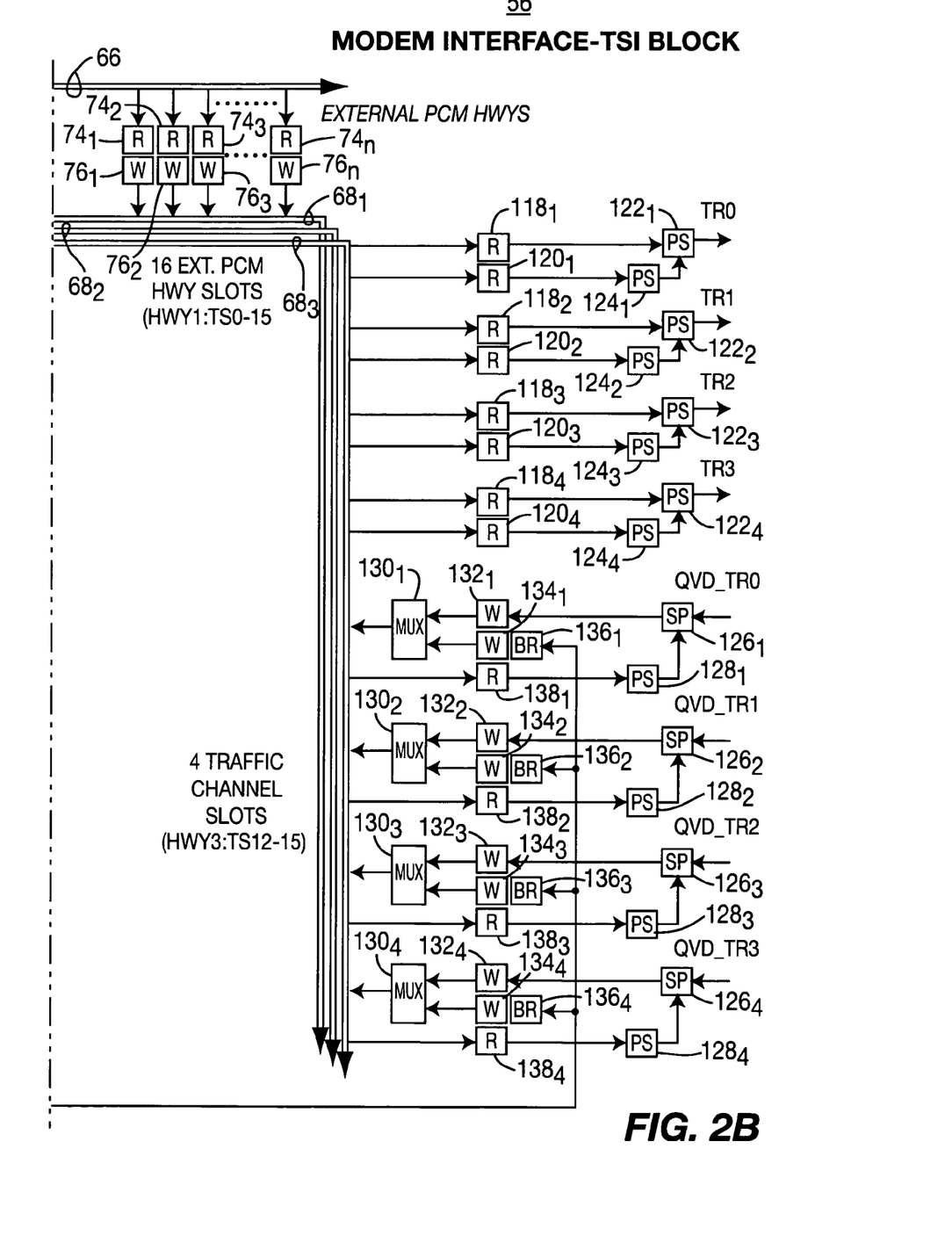
Figure 3:
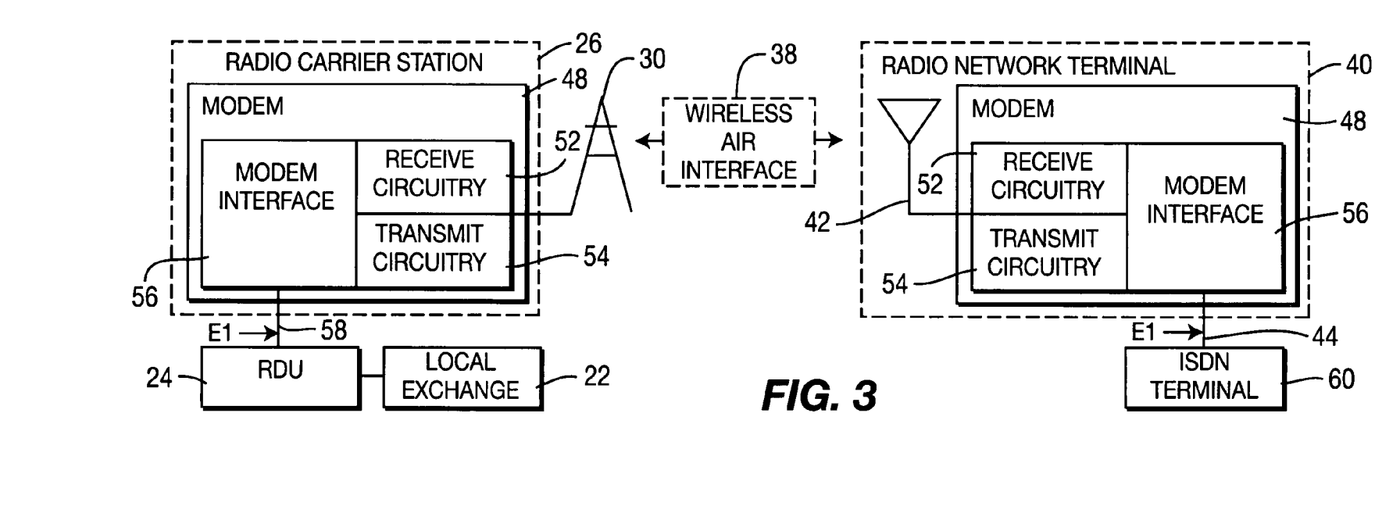
FIG. 3 illustrates a wireless communication network carrying integrated services digital network (ISDN) signals.

FIG. 2 illustrates a modem interface 56. As shown in FIG. 3, the modem interface 56 is used to transfer data between a high data rate terminal, such as an integrated services digital network (ISDN) terminal 60, and a wireless air interface 38. Elements shown in FIG. 3 that correspond to elements shown in FIG. 1 have been given like reference numerals. A modem 48 includes the modem interface 56, receive circuitry 52, and transmit circuitry 54. The modem interface 56 may be located on the RNT side of the wireless air interface as being a component of the RNT 40. Similarly the modem interface 56 may be used on the base station side of the air interface 38, such as within the RCS 26. The modem interface 56 is preferably located at both the RNT 40 and RCS 26.

If used on the RNT side, the modem interface 56 receives data from the ISDN terminal 60 over an ISDN oriented modular-2 highway (IOM-2 highway) 62 (shown as reference numeral 44 in FIG. 3), preferably at an E1 data rate. Conversely, the modem interface 56 also sends data to the ISDN terminal 60 over the IOM-2 highway 62. If used on the base station side, the modem interface 56 transfers data to and from the RDU 24 over a pulse code modulation (PCM) highway 62 (shown as reference numeral 58 in FIG. 3), preferably at an E1 data rate.

Data transmitted to and from the ISDN terminal 60 is sent over eight (8) channels, each in a 2B+D format. Data is sent over each of two (2) B channels. Each B channel has a data rate of 64 kilobits per second (Kbs). Data is also sent over a D channel having a data rate of 16 Kbs. The data sent over the D channel is control data, and is high-level data link controlling (HDLC) encoded. Additionally, each channel has a control information (CI) channel, an MR channel and an MX channel. The CI channel caries line information at a 32 Kbs data rate. The MR and MX channels are used for handshake for the CI channel. Each has a data rate of 8 Kbs.

HDLC encoding converts data into frames. Each frame has six (6) fields. Two of these fields are flag fields which are used for synchronization. They indicate the start and end of a frame. An address field identifies the destination for that frame. A control field identifies the function and purpose of the frame. A data field contains the data for transmission. A circular redundancy code (CRC) field is used for error detection and correction.

A PCM/IOM interface 64 transfers data between the IOM-2 or PCM highway 62 and the external PCM highway 66. Preferably, the external PCM highway 66 has a data rate of 2 megabits per second. If used on the RNT side, the PCM/IOM interface 64 converts the PCM data into IOM-2 data and vice versa. If used on the base station side, the PCM/IOM interface 64 merely passes through the PCM data in both directions.

To transfer data between the various components of the modem interface 56, a multiple data highway structure is used, such as three (3) PCM highways I–III $68_1$–$68_3$ shown in FIG. 2. Each PCM highway $68_1$–$68_3$ uses repeating frames having multiple time slots. A preferred frame would have sixteen (16) time slots numbered from zero to fifteen (TS0–TS15). Each preferred time slot is sixteen (16) bits in length. Each PCM highway $68_1$–$68_3$ has an associated maximum data rate, such as 2 megabits per second. For three PCM highways $68_1$–$68_3$, each having a 2 megabit per second data rate, the combined data rate is 6 megabits per second. Accordingly, multiple PCM highways $68_1$–$68_3$ with lower data rates, such as 2 megabits per second, can be used to effectively transfer data at a much higher data rate, such as 4, 6 or 8 megabits per second. The multiple PCM highways $68_1$–$68_3$ allow the modem interface 56 to utilize PCM highways $68_1$–$68_3$ with a standard data rate, such as 2 megabits per second, and effectively transfer data at a much higher rate. Using a standard data rate PCM highway $68_1$–$68_3$ simplifies the structure of the highways $68_1$–$68_3$. Additionally, since the multiple highways $68_1$–$68_3$ can be selected to have the same data rate as the PCM highway 66, only a single clock domain is required for the highways 66, $68_1$–$68_3$. As a result, power consumption and noise are reduced and testability is improved. Clock routing is also simplified by using only a single clock domain.

One possible assignment using three (3) PCM highways $68_1$–$68_3$, each having 16 time slots (TS0–TS15) is as follows. For PCM highway I $68_1$, TS0–TS15 are all assigned to transferring data to and from the external PCM highway 66 and the PCM highway I $68_1$. A group of read devices $70_1$–$70_n$ read data from the corresponding time slots on PCM highway I $68_1$ and a corresponding group of write devices $72_1$–$72_n$ write that read data onto the IOM PCM highway 66. Conversely, a group of read devices $74_1$–$74_n$ read data from the IOM PCM highway 66 and a corresponding group of write devices $76_1$–$76_n$ write that data onto the corresponding slots on PCM highway I $68_1$.

Each write device is fixed to a predetermined time slot. Each read device can read data from any time slot on any highway $68_1$–$68_3$. The advanced instruction set computer (ARM) processor 88 controls which time slot that each read device reads.

The external PCM highway 66 preferably uses repeating frames of 125 microsecond duration. The read devices $74_1$–$74_n$ can read data starting at any bit in the frame and at a variety of data rates. The starting bit is controlled by a PCM slot parameter and the data rate is controlled by a PCM rate parameter. The ARM processor 88 determines the PCM slot and rate parameters.

PCM highway II $68_2$ is used to transfer data to and from the digital signal processor (DSP) 78 using TS0–TS7. One such DSP 78 is a 54× family processor, preferably a TMS320C54× processor. The DSP 78 may perform functions such as speech, video compression or encryption. Data is read from the PCM highway II $68_2$ using a group of read devices $80_1$–$80_n$. The read data is buffered by a group of buffers $84_1$–$84_n$ and then sent to the DSP 78. Data sent from the DSP 78 is buffered by a group of buffers $86_1$–$86_n$ and then written into the corresponding time slots of the PCM highway II $68_2$ using a group of write devices $82_1$–$82_n$. TS8–TS15 of the PCM highway II $68_2$ are used to interface with telephone interface components.

The ARM processor 88 typically has an associated external flash memory. The ARM processor 88 controls various aspects of the modem 48. Data is read from TS8–TS15 using a group of read devices $90_1$–$90_n$. The read data is buffered by a group of buffers $92_1$–$92_n$ and sent to an IOM interrupt device 98 and the ARM processor 88. The output from the IOM interrupt device 98 is also input to the ARM processor 88. The IOM interrupt device 98 determines whether the C/I channel data has changed from frame to frame and will notify the ARM processor 88 when a change is detected. Conversely, the ARM processor 88 sends data to a group of buffers $94_1$–$94_n$. Write devices $96_1$–$96_n$ take the buffered data and write it to the corresponding time slots of the PCM highway II $68_2$.

An ARM port interface (API) 140 is a shared memory interface between the ARM processor 88 and the DSP 78 and transfers control signals between the ARM 88 and DSP 78. The API 140 preferably has a two kiloword block of memory. The DSP 78 is slaved to the ARM 88. The ARM 88 controls the interrupts and resets of the DSP 78. Conversely, the DSP 78 can interrupt the ARM processor 88.

TS0–TS8 of PCM highway III $68_3$ are used for HDLC processing. Data in TS0–TS8 are read by the HDLC reading devices $108_1$–$108_3$. Data from TS0–TS2 is processed by an HDLC multiplexer (HMUX) 112 which sends processed data to an input/output (I/O) device 116 and an HDLC I controller $114_1$. Data is also sent from the I/O device 116 and HDLC I controller $114_1$ to the HMUX 112. The data processed by the HMUX 112 from the I/O device 116 and HDLC I device $114_1$ is written to TS0–TS2 of PCM highway III $68_3$ using a HDLC write device $110_1$. Data in TS3–TS8 is transferred to and from the other two HDLC controllers (HDLC II $114_2$, TS3–TS5, and HDLC III $114_3$, TS6–TS8). The data in the corresponding slots is read by HDLC read devices $108_2$, $108_3$ prior to being sent to the corresponding HDLC controller $114_2$, $114_3$. Data from the HDLC II $114_2$ and HDLC III $114_3$ controllers is sent to the HDLC write devices $110_2$, $110_3$ and written onto the corresponding slots of PCM highway III $68_3$. Data from each of the three HDLC controllers (HDLC I $114_1$, HDLC II $114_2$ and HDLC III $114_3$) is transferred back and forth to the ARM processor 88. The HDLC controllers $114_1$–$114_3$ are used to communicate with the ARM processor 88 or the traffic channels.

The HDLC controllers (HDLC I $114_1$, HDLC II $114_2$ and HDLC III $114_3$) are used to encode the D channel for transfer over the air interface 38 and decode the D channel after transmission over the air interface 38. As previously mentioned, the D channel is HDLC encoded. To assure that the integrity of the HDLC encoding is preserved after transmission over the air interface 38, the D channel is again HDLC encoded prior to transmission across the wireless air interface 38 by the HDLC controllers $114_1$–$114_3$. Accordingly, the control data is double HDLC encoded. This double encoding allows for error correction over the air interface 38 and for the integrity of the originally HDLC encoded D channel to be maintained.

Conversely, the HDLC controllers $114_1$–$114_3$ also decode a double HDLC encoded D channel received over the wireless interface 38. The double HDLC encoded D channel is stripped of the second HDLC encoding by the HDLC controllers $114_1$–$114_3$. The CRC field data is used to correct any errors that occurred during the wireless transfer. Accordingly, the original D channel is recovered. Preferably, each HDLC controller $114_1$–$114_3$ processes data at 384 Kbs and requires three 128 Kbs time slots.

TS9–11 of PCM highway III $68_3$ are used to transfer data to and from the ARM processor 88. A group of read devices $100_1$–$100_n$ read data from the corresponding slots of PCM highway III $68_3$. The read data is buffered by a group of buffers $102_1$–$102_n$ and is sent to the ARM processor 88. The ARM processor 88 sends data to a group of buffers $104_1$–$104_n$. The buffered data is written by corresponding write devices $106_1$–$106_n$ onto PCM highway III $68_3$.

If the modem interface 56 is used at a base station, the frame synchronization and clock are input to the interface 56. If used in a RNT 40, the frame synchronization and clock are generated by the RNT 40, such as on an application specific integrated circuit (ASIC) containing the interface 56.

TS12–TS15 of PCM highway III $68_3$ are used to carry data received over the air interface 38 and to be sent over the air interface 38. Data received over the air interface 38 is preferably modulated using quadrature phase shift keying (QPSK), although other modulation schemes may be used. Prior to being input to the modem interface 56, the received data is decoded using a double speed quadrature viterbi decoder, although other decoding schemes may be used. The viterbi decoder preferably decodes four received traffic channels (QVD_TR0–QVD_TR3). Preferably, the data rates supported are 8, 16, 32, 64, 128 Kbs. The ARM processor 88 controls the read assignments to the multiple PCM highways $68_1$–$68_3$ effectively controlling data routing and data rate.

Data to be sent over the air interface 38 is preferably convolutionally encoded, spread and transmitted using QPSK modulation, although other wireless transmission schemes may be used. The data is preferably sent over four traffic channels (TR0–TR3).

Data to be sent over the wireless interface 38 is read by a group of read devices $118_1$–$118_4$. One read device $118_1$–$118_4$ is used per traffic channel, TR0–TR3. Another set of read devices $120_1$–$120_4$ is used for encryption of each channel's data. The output of each channel's encryption read devices $120_1$–$120_4$ is input into a parallel to serial converter $124_1$–$124_4$. The serial output of that converter $124_1$–$124_4$ is fed into another parallel to serial converter $122_1$–$122_4$ which also receives the output of the other one of that channel's read devices $118_1$–$118_4$. The two serial outputs are modulo-2 added on a bit basis to encrypt the data. Each channel's encrypted serial output is typically sent to a corresponding convolutional encoder, spreader and modulator for transfer over the wireless interface 38. Each parallel to serial converter $118_1$–$118_4$ is programmed to produce data at a desired bit rate.

Encrypted data received from traffic channels, such as QVD_TR0–QVD_TR3, is input to a group of serial to parallel converters $126_1$–$126_4$. Each channel's serial to parallel converter $126_1$–$126_4$ combines that traffic channel's data with an output of a parallel to serial converter $128_1$–$128_4$ to decrypt the traffic data. The decryption data from each parallel to serial converter $128_1$–$128_4$ originates from data read from TS12–TS15 by corresponding read devices $138_1$–$138_4$. The read data is converted from parallel to serial format by the parallel to serial converters $128_1$–$128_4$. The serial outputs of the serial to parallel converters $126_1$–$126_4$ are inputted to a group of write devices $132_1$–$132_4$ which write the serial output to a group of multiplexers $130_1$–$130_4$. The multiplexed data is sent to TS12–TS15 of the PCM highway III $68_3$. For testing, the DSP 78 outputs a signal to a group of buffers $136_1$–$136_4$. The output of the buffers $136_1$–$136_4$ is also input to the multiplexers $130_1$–$130_4$ through a corresponding group of write devices $134_1$–$134_n$.

What is claimed is:

1. A modem interface for transferring data between a high data rate interface and a wireless interface, the modem interface comprising:

a plurality of parallel data highways having frames, each with sixteen time slots for transferring data, the plurality of parallel data highways outputting data to the high data rate interface and the wireless interface in selected time slots, each parallel data highway being at least partially dedicated to a separate function, wherein:

a first parallel data highway using all sixteen of its time slots for transferring data to and from an external parallel data highway;

a second parallel data highway using eight of its time slots to transfer data to and from a digital signal processor (DSP) and using eight of its time slots to interface with telephone interface components; and a third parallel data highway using nine of its time slots for high-level data link controlling (HDLC) controllers, using three of its time slots to transfer data to and from a second processor, and using four of its time slots for carrying data received and for transmission over the wireless interface, said transmission data being transmitted over four traffic channels;

the second processor for controlling data transfer between the plurality of parallel data highways and sending data using a sub-plurality of the parallel data highways;

the DSP processor sending data using a single one of the parallel data highways;

one of the DSP and second processors slaved to the other of the DSP and second processors; and said two processors using said parallel data highways at the high data rate interface and thereby communicating at a high data rate using said parallel data highways.

2. The modem interface of claim 1 wherein the high data rate interface is an IOM-2 highway.

3. The modem interface of claim 1 wherein the high data rate interface is a PCM highway.

4. The modem interface of claim 1 wherein each of the three parallel data highways has a 2 Mb/s data rate.

5. The modem interface of claim 1 further comprising a plurality of read and write devices, each write device fixedly writing to one of the plurality of parallel data highways and each read device reading data from any of the plurality of parallel data highways.

6. The modem interface of claim 5 wherein the second processor controls each read device so that each read device reads from a selected one of the parallel data highways.

7. The modem interface of claim 1 further characterized by the modem interface receiving data having a first high-level data link controlling (HDLC) encoding, the first HDLC encoded date being encoded into a second HDLC format at a first station using three HDLC controllers such that the produced data is double HDLC encoded and the double HDLC encoded data transmitted over the wireless interface using four traffic channels; and the modem interface receiving the double HDLC encoded data and removing the second HDLC encoding to recover the first HDLC encoded data at the second station, the first HDLC encoding and a second HDLC encoding facilitating error correction over the wireless interface while providing for an integrity of first HDLC encoded data over the wireless interface.

8. A method for transferring data between a high data rate interface and a wireless interface, the method comprising:

providing a plurality of parallel data highways having frames, each with sixteen time slots for transferring data;

inputting data to the parallel data highways from the high data rate interface and the wireless interface in selected time slots;

controlling data transfer between the plurality of highways; and outputting data to the high data rate interface and the wireless interface in selected time slots;

said parallel data highways being at least partially dedicated to a separate function wherein:

a first parallel data highway using all sixteen of its time slots for transferring data to and from an external parallel data highway;

a second parallel data highway using eight of its time slots to transfer data to and from a digital signal processor (DSP) and using eight of its time slots to interface with telephone interface components; and a third parallel data highway using nine of its time slots for high-level data link controlling (HDLC) controllers, using three of its time slots to transfer data to and from a second processor, and using four of its time slots for carrying data received and for transmission over the wireless interface, said transmission data being transmitted over four traffic channels;

and wherein the second processor for sending data using a sub-plurality of the parallel data highways and the DSP processor sending data using a single one of the parallel data highways, one of the DSP and second processors slaved to the other of the DSP and second processors, and said two processors using said parallel data highways at the high data rate interface and thereby communicating at a high data rate using said parallel data highways.

9. The method of claim 8 wherein the high data rate interface is an IOM-2 highway.

10. The method of claim 8 wherein the high data rate interface is a PCM highway.

11. The method of claim 8 wherein each of the three parallel data highways has a 2 Mb/s data rate.

12. The method of claim 8 wherein the controlling includes using a plurality of read and write devices, each write device fixedly writing to one of the plurality of parallel data highways and each read device reading data from any of the plurality of parallel data highways.

13. The method of claim 8 comprising:

producing data having a first high-level data link controlling (HDLC) encoding at a first station for transfer over the wireless interface;

encoding the first HDLC encoded data into a second HDLC format using three HDLC controllers at the first station such that the produced data is double HDLC encoded;

transmitting the double HDLC encoded data over the wireless interface using four traffic channels;

receiving the double HDLC encoded data at the second station; and removing the second HDLC encoding to recover the first HDLC encoded data at a second station, the first HDLC encoding and the second HDLC encoding facilitating error correction over the wireless interface while providing for an integrity of first HDLC encoded data over the wireless interface.

14. The method of claim 13 wherein the first station is a radio network terminal and the second station is a radio carrier station, the method further comprising:

prior to producing the first HDLC encoded data, receiving the first HDLC encoded data from an IOM-2 highway.

15. The method of claim 13 wherein the first station is a radio carrier station and the second station is a radio network terminal, the method further comprising:

prior to producing the first HDLC encoded data, receiving the first HDLC encoded data from a PCM highway.

16. A radio network terminal (RNT) for transferring data between a high data rate interface and a wireless interface, the RNT comprising:

a receiver and a transmitter for transferring data over the wireless interface;

an input and an output for transferring data over the high data rate interface;

a plurality of parallel data highways having frames, each with sixteen time slots for transferring data, the plurality of parallel data highways outputting data to the high data rate interface and the wireless interface in selected time slots, each parallel data highway being at least partially dedicated to a separate function, wherein:

a first parallel data highway using all sixteen of its time slots for transferring data to and from an external parallel data highway;

a second parallel data highway using eight of its time slots to transfer data to and from a digital signal processor (DSP) and using eight of its time slots to interface with telephone interface components; and a third parallel data highway using nine of its time slots for high-level data link controlling (HDLC) controllers, using three of its time slots to transfer data to and from a second processor, and using four of its time slots for carrying data received and for transmission over the wireless interface, said transmission data being transmitted over four traffic channels;

the second processor for controlling data transfer between the plurality of highways and sending data using a sub-plurality of the parallel data highways; and the DSP processor sending data using a single one of the parallel data highways;

one of the DSP and second processors slaved to the other of the DSP and second processors; and said two processors using said parallel data highways at the high data rate interface and thereby communicating at a high data rate using said parallel data highways.

17. The RNT of claim 16 wherein the receiver and the transmitter transfer data using QPSK modulation in CDMA format.

18. The RNT of claim 16 wherein the RNT is operatively coupled to an ISDN terminal via the high data rate interface.

19. The RNT of claim 16 wherein the high data rate highway is an IOM-2 highway.

20. The RNT of claim 16 further characterized by:

the modem interface receiving data having a first high-level data link controlling (HDLC) encoding the first HDLC encoded data into a second HDLC format using three HDLC controllers at the first station such that the produced data is double HDLC encoded and the double HDLC encoded data transmitted over the wireless interface using four traffic channels; and the modem interface receiving the double HDLC encoded data and removing the second HDLC encoding to recover the first HDLC encoded data at the second station, the first HDLC encoding and the second HDLC encoding facilitating error correction over the wireless interface while providing for an integrity of first HDLC encoded data over the wireless interface.

21. A method of communicating data over a wireless interface of a wireless communication network having a first station and a second station, the method comprising:

producing data having a first high-level data link controlling (HDLC) encoding at the first station for transfer over the wireless interface;

encoding the first HDLC encoded data using three HDLC controllers into a second HDLC format at the first station such that the produced data is double HDLC encoded;

transmitting the double HDLC encoded data over the wireless interface using four traffic channels;

receiving the double HDLC encoded data at the second stations; and removing the second HDLC encoding to recover the first HDLC encoded data at the second station, the first HDLC encoding and the second HDLC encoding facilitating error correction over the wireless interface while providing for an integrity of first HDLC encoded data over the wireless interface.

22. The method of claim 21 wherein the first station is a radio network terminal and the second station is a radio carrier station, the method further comprising:

prior to producing the first HDLC encoded data, receiving the first HDLC encoded data from an IOM-2 highway.

23. The method of claim 21 wherein the first station is a radio carrier station and the second station is a radio network terminal, the method further comprising:

prior to producing the first HDLC encoded data, receiving the first HDLC encoded data from a PCM highway.

* * * * *

UNITED STATES PATENT AND TRADEMARK OFFICE
CERTIFICATE OF CORRECTION

| | |
|---|---|
| PATENT NO. | : 6,973,523 B1 |
| APPLICATION NO. | : 09/699145 |
| DATED | : December 6, 2005 |
| INVENTOR(S) | : Kaewell, Jr. et al. |

It is certified that error appears in the above-identified patent and that said Letters Patent is hereby corrected as shown below:

At column 2, line 49, after the word "channel", delete "caries" and insert therefor --carries--.

At column 5, line 54, before the word "outputs", delete "serial".

At column 5, line 56, before the word "output", delete "serial".

At claim 1, column 6, line 21, before the word "processor", delete "second" and insert therefor --DSP--.

At claim 1, column 6, line 24, before the word "processor", delete "DSP" and insert therefor --second--.

At claim 7, column 6, line 50, after the word "encoded", delete "date", and insert therefor --data--.

At claim 8, column 7, line 24, before the word "processor", delete "second" and insert therefor --DSP--.

At claim 8, column 7, line 26, before the word "processor", delete "DSP" and insert therefor --second--.

At claim 16, column 8, line 33 before the word "processor", delete "second" and insert therefor --DSP--.

UNITED STATES PATENT AND TRADEMARK OFFICE
CERTIFICATE OF CORRECTION

PATENT NO. : 6,973,523 B1
APPLICATION NO. : 09/699145
DATED : December 6, 2005
INVENTOR(S) : Kaewell, Jr. et al.

It is certified that error appears in the above-identified patent and that said Letters Patent is hereby corrected as shown below:

At claim 16, column 8, line 36, before the word "processor", delete "DSP" and insert therefor --second--.

Signed and Sealed this

Nineteenth Day of August, 2008

JON W. DUDAS
*Director of the United States Patent and Trademark Office*